(12) United States Patent
Demanze

(10) Patent No.: US 10,619,767 B2
(45) Date of Patent: Apr. 14, 2020

(54) TUBULAR PIPE WITH A COMPOSITE HOLDING STRIP

(71) Applicant: TECHNIP FRANCE, Courbevoie (FR)

(72) Inventor: Frédéric Demanze, Caudebec-en-Caux (FR)

(73) Assignee: TECHNIP FRANCE (FR)

( * ) Notice: Subject to any disclaimer, the term of this patent is extended or adjusted under 35 U.S.C. 154(b) by 26 days.

(21) Appl. No.: 15/319,474

(22) PCT Filed: Jun. 15, 2015

(86) PCT No.: PCT/FR2015/051572
§ 371 (c)(1),
(2) Date: Dec. 16, 2016

(87) PCT Pub. No.: WO2015/193595
PCT Pub. Date: Dec. 23, 2015

(65) Prior Publication Data
US 2017/0122467 A1 May 4, 2017

(30) Foreign Application Priority Data
Jun. 16, 2014 (FR) ..................... 14 55486

(51) Int. Cl.
*F16L 11/00* (2006.01)
*F16L 11/08* (2006.01)
(Continued)

(52) U.S. Cl.
CPC ............ *F16L 11/083* (2013.01); *B29C 70/52* (2013.01); *F16L 11/02* (2013.01); *F16L 11/088* (2013.01)

(58) Field of Classification Search
CPC ......... F16L 11/083; F16L 11/02; F16L 11/088
(Continued)

(56) References Cited

U.S. PATENT DOCUMENTS 3,387,500 A * 6/1968 Hutzenlaub ............ B29D 29/00
474/260
3,858,616 A * 1/1975 Thiery .................. B29C 53/785
138/133

(Continued)

FOREIGN PATENT DOCUMENTS

FR   2 739 673 A1   4/1997
FR   2 776 358 A1   9/1999
(Continued)

OTHER PUBLICATIONS

Specification for Unbonded Flexible Pipe, Upstream Segment, API Specification 17J, Second Edition, Nov. 1999, Effective Date: Jul. 1, 2000; American Petroleum Institute (53 total pages).
(Continued)

*Primary Examiner* — James F Hook
(74) *Attorney, Agent, or Firm* — Ostrolenk Faber LLP

(57) ABSTRACT

A flexible tubular conduit (10) having a tubular inner pressure structure including a tubular sheath (16) and a pressure vault (18) for taking up the radial forces, and a tubular outer tensile structure having at least one web of tensile armor wires (22, 24), and a holding strip (28) wound in a short-pitch helix over the web of tensile armor wires (24), the holding strip (28) comprising a layer of polymer material and a plurality of strands of fibers stretched substantially in the longitudinal direction of the holding strip (28). The fibers of the strands of the plurality of strands of fibers are mineral fibers, and the plurality of strands of fibers is embedded in the layer of polymer material.

16 Claims, 2 Drawing Sheets

(51) Int. Cl.
*B29C 70/52* (2006.01)
*F16L 11/02* (2006.01)

(58) Field of Classification Search
USPC .............................. 138/125, 129, 130, 135
See application file for complete search history.

(56) References Cited

U.S. PATENT DOCUMENTS

| | | | | |
|---|---|---|---|---|
| 5,024,252 | A * | 6/1991 | Ochsner | F16L 11/083 138/130 |
| 5,261,462 | A * | 11/1993 | Wolfe | F16L 11/088 138/129 |
| 6,106,944 | A * | 8/2000 | Heikkila | B29C 70/08 428/105 |
| 6,165,586 | A * | 12/2000 | Nouveau | B29C 70/20 156/178 |
| 6,491,779 | B1 * | 12/2002 | Bryant | F16L 11/081 156/169 |
| 6,872,343 | B2 * | 3/2005 | Edwards | B29C 70/525 264/171.1 |
| 6,899,140 | B2 * | 5/2005 | Fraser | F16L 9/12 138/129 |
| 7,781,040 | B2 * | 8/2010 | Coyle | F16L 11/081 138/129 |
| 8,082,954 | B2 * | 12/2011 | Rytter | B29C 53/582 138/126 |
| 8,353,316 | B2 * | 1/2013 | Do | F16L 11/083 138/129 |
| 8,505,587 | B2 * | 8/2013 | Glejbol | B32B 5/024 138/134 |
| 8,640,739 | B2 * | 2/2014 | Do | F16L 11/083 138/125 |
| 9,400,067 | B2 * | 7/2016 | Felix-Henry | F16L 11/083 |
| 2005/0189029 | A1 * | 9/2005 | Quigley | E21B 17/20 138/125 |
| 2006/0249215 | A1 * | 11/2006 | Bryant | B29C 63/10 138/125 |
| 2008/0006337 | A1 * | 1/2008 | Quigley | F16L 9/19 138/125 |
| 2008/0145579 | A1 * | 6/2008 | Nguyen | B32B 1/08 428/36.1 |
| 2009/0000683 | A1 * | 1/2009 | Sheldrake | F16L 11/083 138/129 |
| 2009/0022920 | A1 * | 1/2009 | Vinarsky | F16L 9/123 428/36.2 |
| 2011/0226374 | A1 * | 9/2011 | Kalman | F16L 11/083 138/129 |
| 2014/0158247 | A1 * | 6/2014 | Kristiansen | F16L 11/081 138/132 |
| 2014/0230946 | A1 * | 8/2014 | Procida | F16L 59/153 138/129 |
| 2014/0305532 | A1 * | 10/2014 | Glejbol | F16L 11/04 138/129 |
| 2015/0059904 | A1 * | 3/2015 | Nokkentved | F16L 11/088 138/104 |

FOREIGN PATENT DOCUMENTS

| | | |
|---|---|---|
| FR | 2 835 584 A1 | 8/2003 |
| WO | WO 99/49259 | 9/1999 |
| WO | WO 03/044414 A1 | 5/2003 |
| WO | WO 2008/135663 A2 | 11/2008 |

OTHER PUBLICATIONS

Recommended Practice for Flexible Pipe, API Recommended Practice 17B, Third Edition, Mar. 2002, American Petroleum Institute (166 total pages).
Choke and Kill Equipment, API Specification 16C, Second Edition, Mar. 2015, API Monogram Program Effective Date: Sep. 28, 2015, American Petroleum Institute (134 total pages).
Drilling and Well Servicing Equipment, API Specification 7K, Sixth Edition, Dec. 2015, API Monogram Program Effective Date: Dec. 30, 2016, published by the American Petroleum Institute (134 total pages).
International Search Report dated Sep. 24, 2015 issued in corresponding International patent application No. PCT/FR2015/051572.
Written Opinion dated Sep. 24, 2015 issued in corresponding International patent application No. PCT/FR2015/051572.

* cited by examiner

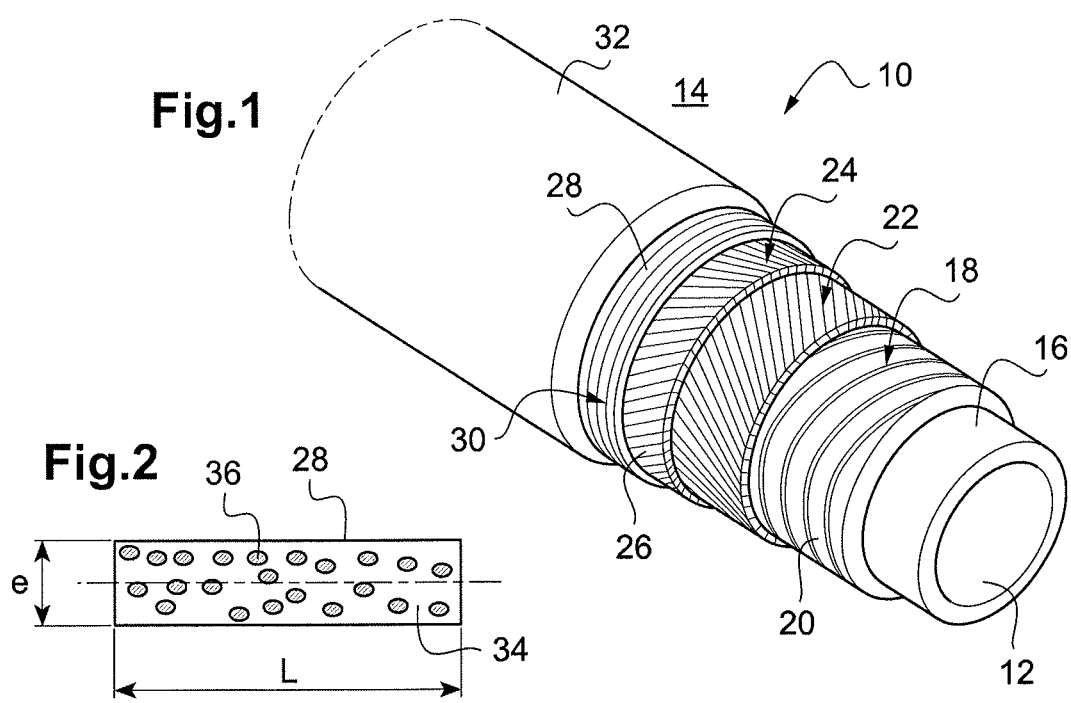
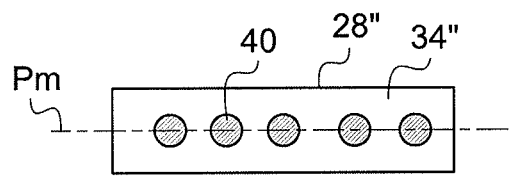
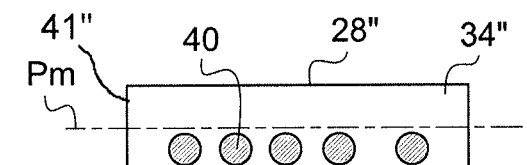
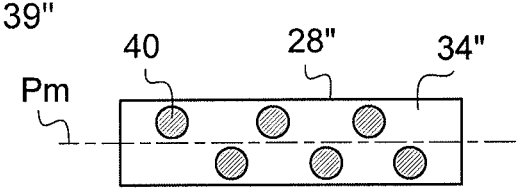
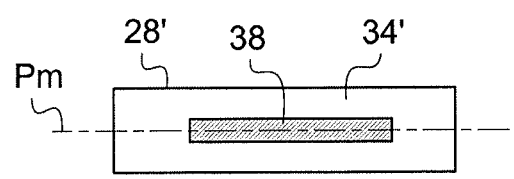
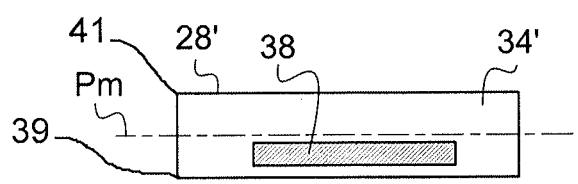

Fig.5A
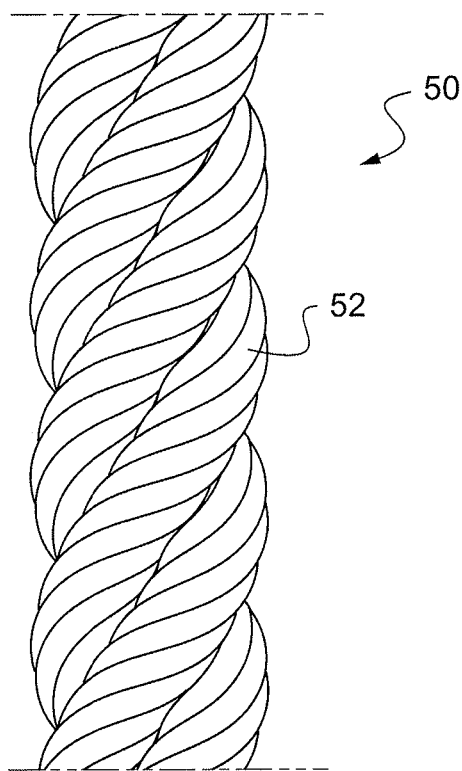
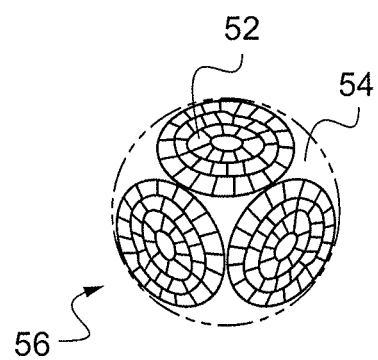
Fig.5B
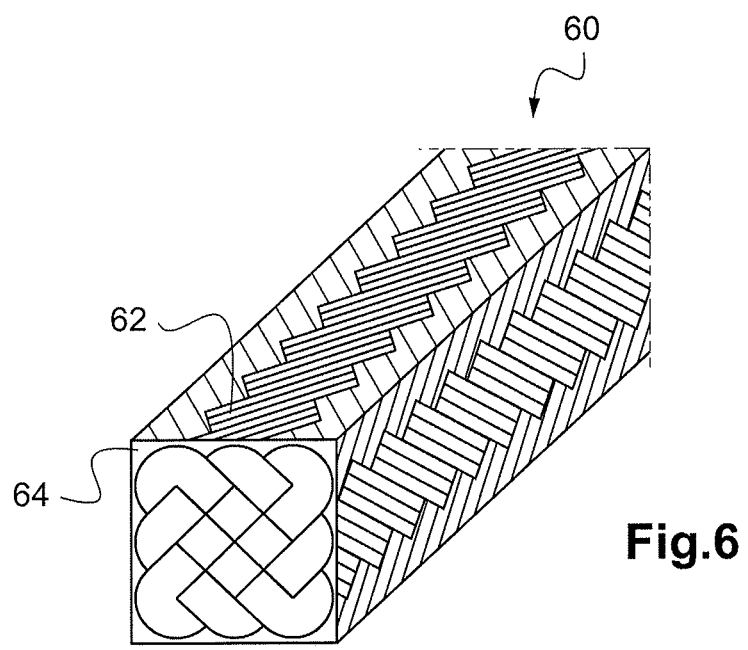
Fig.6

TUBULAR PIPE WITH A COMPOSITE HOLDING STRIP

CROSS-REFERENCE TO RELATED APPLICATIONS

The present application is a 35 U.S.C. §§ 371 national phase conversion of PCT/FR2015/051572, filed Jun. 15, 2015, which claims priority of French Patent Application No. 1455486, filed Jun. 16, 2014, the contents of which are incorporated by reference herein. The PCT International Application was published in the French language.

TECHNICAL FIELD

The present invention relates to a flexible tubular pipe designed for the transport of hydrocarbons.

One contemplated field of application is particularly, but not exclusively, that of the transport of hydrocarbons in a marine environment between a marine bottom and an overlying surface.

BACKGROUND OF THE INVENTION

So-called "unbonded" flexible tubular pipes are described in the normative documents API 17J, "Specification for Unbonded Flexible Pipe", API RP 17B, "Recommended Practice for Flexible Pipe", API 17J, "Specification for Unbonded Flexible Pipe", API 16C, "Choke and Kill Systems", and API 7K, "Rotary Drilling Hose", published by the American Petroleum Institute. Those pipes comprise several superposed layers of metallic materials and plastic materials, giving them their mechanical properties and their sealing properties with respect to the hydrocarbon being transported and with respect to the environment.

They also generally comprise, from the inside to the outside, a metallic carcass made of an interlocked spiral metal strip, a pressure sheath of polymer material, a short-pitch helical winding of a metallic wire forming a pressure vault, at least one web of tensile armor layers realized by a long-pitch winding of a plurality of metallic wires around said pressure vault, and an external protection sheath.

When the pipes are subjected to strong hydrostatic pressures, and especially in the deep sea, once the internal pressure of the pipe decreases too much, just below the hydrostatic pressure, they are subjected to the "inverse bottom effect". The pipe then undergoes axial compression forces tending to shorten it. When, in a dynamic and turbulent environment, transverse stresses on the pipe are added to this, the armor wires of the tensile armor webs then tend to buckle laterally and eventually disorganize the pipe locally in an irreversible manner. These armor wires then form so-called "bird cage" structures locally.

To remedy this, one winds a holding strip in a short-pitch helix around the outermost web of tensile armor wires. These holding or reinforcing strips are made of organic fibers, such as aramide, and they will then restrain the effects of radial buckling and swelling of the wires of the tensile armor webs. Moreover, it has been proposed to coat the holding strip with a polymer material in order to lengthen its lifetime. The polymer material is then integrated with the holding strip and forms a single whole with it. One may refer to document WO2008/135 663 which describes such a holding strip. However, the strip so coated is not protected against degradation in all operating conditions, and especially very deep marine conditions.

It has also been proposed to create steel wires to define the holding strips. However, this makes the pipes significantly heavier.

SUMMARY OF THE INVENTION

Thus, a problem which arises and which the present invention proposes to solve is to provide a flexible tubular pipe which is even more resistant to the inverse bottom effect than the pipes of the prior art.

In order to solve this problem, the present invention proposes a flexible tubular pipe designed for the transport of hydrocarbons comprising, on the one hand, a tubular inner pressure structure comprising a tubular sealing sheath and a pressure vault around the tubular sealing sheath to take up the radial stresses, and on the other hand a tubular outer tensile structure comprising at least one web of tensile armor wires bearing against the pressure vault, and at least one holding strip wound in a short-pitch helix around the web of tensile armor wires in order to hold the tensile armor wires radially against the pressure vault, the holding strip comprising a layer of polymer material and a plurality of strands of fibers stretched substantially in the longitudinal direction of the holding strip. The holding strip is preferably comprised of a helically wound strip and its longitudinal direction is in the direction of the helix. The fibers of the strands of the plurality of strands of fibers are mineral fibers, and the plurality of strands of fibers is embedded inside the layer of polymer material. The strands of fibers may be together configured to define a mat of the strands.

The field of fibers can be divided into four major categories, namely, natural fibers (fibers of cotton, flax, wool, silk, etc.), artificial fibers (viscose fibers), synthetic fibers (fibers of polyamides, polyesters, polyolefins, acrylics, etc.) and specialty fibers, that is, organic fibers and inorganic fibers.

By "inorganic mineral fibers" is meant all fibers not falling within any of the first three categories, but only in the fourth category, taking care to exclude the organic fibers. The inorganic mineral fibers include, among others, fibers of glass, basalt, ceramic and carbon.

Thus, one characteristic of the invention comprises creating fiber strands which are entirely embedded in the thickness of the layer of polymer material. In this way, the holding strip is realized in a composite material including not organic fibers of aramide type, for example, but inorganic mineral fibers. These mineral fibers possess the advantage of being much more resistant to hydrolysis than organic fibers, and what is more they allow one to provide the holding strips with a high modulus of elasticity, for example, greater than 100 GPa. What is more, the mineral fibers have the double advantage of being light and less vulnerable to corrosion than metallic fibers.

According to one particularly advantageous embodiment of the invention, the mineral fibers are basalt fibers. These fibers have mechanical properties as well as an inertia with respect to hydrolysis that are superior to those of glass fibers and they are also less costly than carbon fibers. What is more, they present advantageous surface qualities enabling a good wetting of the polymer material during the fabrication of the holding strip. According to another embodiment, the mineral fibers are boron fibers or also carbon fibers. Boron fibers are less costly than carbon fibers and, like all basalt fibers, they have a good resistance to hydrolysis.

According to another particularly advantageous embodiment of the invention, the strands of the plurality of fiber strands are preferably stranded. This means that each strand that is stranded extends longitudinally along the holding strip independently of the other stranded strands. In this way, the mechanical strength of the fiber strands is increased. According to another preferred embodiment, the strands of the plurality of fiber strands are braided.

Moreover, according to one advantageous embodiment of the invention, the fiber strands of said plurality of fiber strands are distributed uniformly within the layer of polymer material. In this way, the fiber strands confer a relatively homogeneous mechanical strength on the holding strip, within the mass of the layer of polymer material.

According to another preferred embodiment of the invention, the layer of polymer material has a thickness and have a median dividing the layer of polymer material, in terms of its thickness, into two identical portions, and the fiber strands of the plurality of fiber strands extend within one of the two portions. In this way, the possibility of deformation of the other of the two portions is rendered easier as compared to the one of the two portions including the plurality of fiber strands, and therefore applying the holding strip will be rendered easier around the web of tensile armor wires. In a preferred arrangement, the portion inward toward the vault contains the web of tensile armor wires. The method of deformation of the holding strip when it is wound around the web of tensile armor wires will be explained in greater detail in the remainder of the description.

Moreover, according to one particularly advantageous embodiment of the invention, the fiber strands of the plurality of fiber strands are encapsulated in another polymer material. Thus, the risks of transverse rupture of the holding strip are reduced. Likewise, the cohesion with the polymer material of the holding layer, the wear resistance and the abrasion resistance, as well as the compression of the fibers are improved.

According to one variant embodiment of the invention, the other polymer material encapsulating the fibers is a thermoplastic material. In this way, the encapsulation of the fiber strands is easier to carry out using a thermoplastic material in the molten state, and by cooling down the fiber strands coated with the molten material.

According to another variant embodiment, the other polymer material encapsulating the fibers is a thermosetting material. In this way, the fiber strands so encapsulated are even better protected against corrosion which may result from the transport of liquid hydrocarbons inside the pipe of the invention.

In regard to the polymer material of the one layer of polymer material, this is advantageously a thermoplastic. For example, it is chosen from among the family of polyolefins, polyamides, polyether ketone (PEK), polyetherether ketone (PEEK), polyarylether ketone (PEAK), polyamide-imide (PAI), polyether imide (PEI), poly(ether sulfones) (PES), polyimide (PI), polyphenyl sulfone (PPS), polyether sulfone (PES), polysulfone (PSU), chlorinated polyvinyl chloride (PVC)c, polyphenylene oxide (PPO), polymethacrylic imide (PMI), etc.

In this way, its production is also made easier. According to another embodiment, the polymer material of said one layer of polymer material is preferably thermosetting, for example, chosen from among the systems based on an aromatic or cycloaliphatic hardener. Thus, the mechanical strength of the fiber strands so encapsulated is increased.

According to another variant embodiment of the invention, the holding strip is reinforced by a thin film or fabric. Said thin film comprises longitudinal fibers of glass, carbon, or aramide so as to form a fabric, a nonwoven or a mat, and it is disposed on at least one of the upper or lower faces of the holding strip of the invention by gluing. In this way, the mechanical strength to transverse stresses of the holding strip is improved.

Other particularities and advantages of the invention will emerge upon perusal of the following description of particular embodiments of the invention, given by way of nonlimiting illustration, making reference to the attached drawings:

BRIEF DESCRIPTION OF THE DRAWINGS

FIG. 1 is a schematic perspective and cutaway view of a flexible tubular pipe according to the invention;

FIG. 2 is a schematic cross-sectional view of a detail of FIG. 1 according to a first variant embodiment;

FIGS. 3A, 3B and 3C illustrate schematically in cross section the detail represented in FIG. 2 according to three different embodiments of a second variant embodiment;

FIGS. 4A and 4B illustrate schematically in cross section the detail represented in FIG. 2 according to two different embodiments of a third variant embodiment;

FIG. 5A shows a fragmentary portion of three braided strands of fibers;

FIG. 5B is a cross-section of the portion in FIG. 5A in another polymer material; and FIG. 6 shows a fragmentary portion of fibers encapsulated in another polymer material.

DESCRIPTION OF EMBODIMENTS

FIG. 1 illustrates in partial cutaway view a flexible tubular pipe 10, showing the different superposed layers of which it is composed. These are consecutively produced one on top of the other, from the inside 12 of the pipe to the outside 14. The inside 12 forms an internal flow space for the hydrocarbon.

The innermost layer is a pressure sheath 16 realized from a polymer material by hot extrusion. The polymer material used is advantageously a semi-crystalline thermoplastic material. This pressure sheath 16 is tight and thick enough to be able to resist the pressurized and possibly hot flow of a hydrocarbon.

Next, the pressure sheath 16 is covered by a pressure vault 18 made of a metallic wire with a substantially rectangular cross section, wound in a short-pitch spiral to form contiguous turns 20. The turns 20 will be applied radially against the pressure sheath 16. The pressure vault 18 is thus able to absorb the external forces exerted radially by the hydrostatic pressure on the flexible tubular pipe in a marine environment, as well as the internal radial forces exerted by the circulation of the hydrocarbon fluid within the internal flow space.

The pressure vault 18 is covered by two webs 22, 24 of a plurality of armor wires wound with a long pitch and in two opposite directions in criss-crossing manner. The armor layers of these webs 22, 24 are so-called tensile armor layers, since they are able to absorb the longitudinal tensile forces exerted on the pipe both during its installation in situ and during operation. The outermost web of armor wires 24 defines a cylindrical, substantially circular bearing surface 26.

According to one variant embodiment, for high pressure or great depth applications, the pressure vault 18 is covered by at least two pairs of tensile armor webs.

On the cylindrical bearing surface 26 of the web of armor wires 24 there is wound in a short-pitch continuous helix a holding or reinforcing strip 28. This is wound with strong tension around the web of armor wires 24 forming turns, preferably contiguous turns, so as to produce a substantially homogeneous holding layer 30. One characteristic of the invention lies in the structure and the constitution of the holding strip 28, which comprises a layer of polymer material and mineral fibers. Different variants of this will be described later on in the description.

Moreover, an external sealing sheath 32 extruded from a thermoplastic polymer will cover the holding layer 30.

The zone situated between the pressure sheath 16 and the external sealing sheath 32 and comprising the pressure vault 18, the tensile armor layers 22, 24 and the holding strip 28, defines an annular space of the flexible tubular pipe 10.

By winding the holding strip 28 so that its edges are in contact, or by a winding with contiguous turns, or overlapping, or by a winding with overlapping turns, the annular space of the flexible tubular pipe 10 becomes confined, thus favoring the condensation of water and/or limiting the permeation of gases contained in the hydrocarbon fluid circulating within the internal flow space to the outside. The environment of the annular space to which the layers 18, 22 and 24 are subjected is more severe in this case, that is, conditions exist which are very favorable to the initiation of a corrosion of the metallic layers. Thus, to reduce the corrosion, holes are provided in the thickness of the strip 28. In this way, the diffusion of gases to the outside of the annular space of the flexible tubular pipe is optimized.

Reference is made to FIG. 2, which illustrates a cross section of the holding strip 28 illustrated in FIG. 1 and according to a first variant embodiment. In a transverse cross section, this presents the general form of a right-angled parallelepiped and it is composed of a polymer matrix 34 inside which are embedded mineral fiber strands 36 extending longitudinally.

The mineral fiber strands 36 are preferably strands of basalt fiber, whose modulus of elasticity is of the order of 50 GPa, and whose tensile strength is of the order of 1000 MPa. These values are greater than those which may be obtained with glass fibers, for example. The reinforcing or holding strip comprising the mineral fibers 36 so implemented has a thickness between, for example, 0.05 mm and 5 mm and a width between 45 mm and 500 mm. The mineral fibers used are of the unidirectional fiber type, and they are stretched longitudinally in the direction of the holding strip 28, that is stretched helically, being embedded inside the thermoplastic or thermosetting polymer material 34. The fiber strands are uniformly dispersed in the matrix of the polymer material 34. Being a thermosetting material, the use of epoxy resin presents advantages in terms of aging. The holding strip 28 so obtained has a ratio of width L to thickness e between, for example, 50 and 100.

Thus, the holding strip 28 may have a tensile strength between, for example, 1000 MPa and 3000 MPa.

Moreover, in order to improve the mechanical strength in the transverse direction of the holding strip 28, the unidirectional fibers are replaced by a two-dimensional or multiaxial textile material, or by a mat 38 as in FIG. 4A or 4B.

According to a second variant illustrated in FIGS. 4A and 4B, broken up into two different embodiments, the mineral fiber strands are grouped together, whereas the transverse cross section of the holding strip is also substantially a right-angled parallelepiped. The analogous elements in FIGS. 4A and 4B to those of FIG. 2 have the same references with a prime symbol "'". The new references are hereafter a continuation of the series of the references already assigned. Thus, one finds the holding strip 28' in cross section. This defines a median called a median plane Pm which divides the holding strip into two portions, which portions are the images of each other in relation to this plane Pm and in the thickness direction. The mineral fiber strands are then shaped into a reinforcing element 38, such as a mat, having a substantially rectangular geometry, which reinforcing element 38 extends longitudinally inside the matrix of polymer material 34' and at the center median of the matrix along the median plane Pm. Along the cross section, the width of the reinforcing element 38 is, for example, between 50% and 75% of the total width of the matrix of polymer material 34', while its thickness is between 20% and 40% of the total thickness of the matrix of polymer material 34'. Thus, as represented in FIG. 4A, the reinforcing element 38 of mineral fiber strands is centered both laterally and in the thickness of the matrix of polymer material 34'. In this way, the mechanical properties of the holding strip 28 prove to be substantially homogeneous.

According to another embodiment of the invention, represented in FIG. 4B, the reinforcing element 38 of mineral fiber strands is still centered laterally inside the matrix of polymer material 34' of the holding strip 28'. However, the reinforcing element 38 extends in the lower portion 39 of the element 28' delimited by the median plane Pm. Therefore, the mechanical properties of the holding strip 28 so produced are no longer homogeneous. In this way, for example, the holding strip 28 will be applied against the cylindrical bearing surface 26 of the web of armor wires 24 so that said lower portion 39 comes precisely into contact with the cylindrical bearing surface 26. In this way, the holding strip 28 being wound around the cylindrical bearing surface 26, said the lower portion 39 of the holding strip 28 tends to be compressed axially, while the upper portion 41 tends to be stretched longitudinally. In reality, the lower portion remains very slightly deformable thanks to the mat 38 of fiber strands, while the upper portion comprised almost exclusively of polymer material tends to become stretched. In this way, it is the less deformable portion which is closest to the web of armor wires 24. Therefore, the armors of this web are held tightly bound radially against the center of the tubular pipe 10. The risks of local deformation of the pipe into a "bird cage" are thus substantially zero.

The polymer material chosen for the realization of the reinforcing element 38 is chosen from among the thermoplastic or thermosetting polymer materials.

According to a third variant illustrated in FIGS. 3A, 3B and 3C regarding three embodiments, the mineral fiber strands are themselves encapsulated in a polymer material. Such encapsulation of fiber strands are shown in FIG. 5B, where encapsulation of strands 52 of FIG. 5A is illustrated. FIG. 6 shows a portion of stranded strands of fibers 32 encapsulated in another polymer material 64. In these FIGS. 3A, 3B and 3C, the elements analogous to those of FIG. 2 have the same references with a double prime symbol """.

Thus, we find in the third variant of FIGS. 3A to 3C the holding strip 28" in transverse cross section. Each holding strip defines a median in a median plane Pm dividing the strip 28" into two portions, images of each other in relation to this plane Pm in the thickness direction. The mineral fiber strands are, according to this third variant, shaped into a rod 40 with diameter between 0.1 mm and 5 mm, for example. The rods then extend longitudinally inside the matrix of polymer material 34" and at the center of the matrix along the median plane Pm, the rods are regularly spaced apart from each other. The aforementioned holes for the purpose of reducing the corrosion are provided in the thickness of the strip 28, 28' and 28", between the mineral fiber strands 36 in FIG. 2, between the rods 40 in FIGS. 3A, 3B and 3C, or also around the reinforcing element 38.

The rods 40 in FIG. 3A or 50 in FIG. 5A may be comprised of strands 52 of basalt fiber embedded in another proper matrix of a polymer material. They have a circular or a rectangular section. The strands of basalt fiber can be braided as in FIG. 5A or stranded as in FIG. 5B, so as to improve their tensile strength. The rods 40 can then be produced by pultrusion, drawing the fiber strands through a die plate. The polymer material of the other matrix used to produce the rods 40 is, for example, a thermoplastic material. Preferably, the polymer material is a thermosetting material allowing an improved strength and stability of the rods 40. The rods themselves are then embedded in the matrix of polymer material 34", which is itself thermoplastic or preferably thermosetting.

According to this third variant embodiment, the wear and abrasion resistance of the mineral fibers is increased. Moreover, they are more resistant to compression. What is more, thanks to such an embodiment of the fiber strands, the holding strip 28" so produced has a better breaking strength in the transverse direction.

According to the embodiment illustrated in FIG. 3A, where the rods 40 extend inside the polymer matrix 34" along the median plane Pm, it will be observed that the fiber strands experience very little axial stress when the holding strip 28" is wound against the web of armor wires 24. On the other hand, the thickness of polymer material of the matrix 34" situated toward the inside of the curve of the holding strip 28" tends to contract axially, while the thickness toward the outside of the curve is stretched axially.

Such an embodiment may be suitable for medium pipe diameters, between the large diameters and the small diameters, since the holding strip 28" may experience a significant curvature without affecting the mineral fiber strands.

Regarding the embodiment of the holding strip 28" as illustrated in FIG. 3B, where the rods 40 extend, preferably entirely, but at least mostly inside the bottom or inner portion 39" of the polymer matrix 34" and the rods are not present in the top or outer portion 41", that is, the rods extend inside only in one of the portions delimited by the median plane Pm, this may be better adapted to small pipe diameters. In this case, the holding strip 28" is wound around the web of armor wires 24 in a way such that the rods 40 are situated toward the inside of the curve and toward the bearing surface 26. In this way, the thickness of polymer material of the matrix 34" without any reinforcement and situated toward the outside of the strip 28" tends to become stretched.

As for the embodiment of the holding strip 28" illustrated in FIG. 3C, where the rods 40 are uniformly distributed on either side of the median plane Pm, its flexural strength is more substantial. Therefore, it is designed for pipes of larger diameter.

It will be noted that the flexural possibilities of the holding strips 28" are likewise very directly tied to the nature of the polymer materials used for the matrix 34". In a general way, thermoplastic polymer materials are more flexible than thermosetting polymer materials. Thus, the choice of the polymer materials is contingent upon the radius of curvature that one wishes to use for the holding strips 28".

Two distinct methods are provided for putting the holding strip 28 in place around the cylindrical bearing surface 26 of the web of armor wires 24.

The first method involves the preheating of the matrix of polymer material 34 beyond its softening temperature. Thus, when winding the holding strip 28 around the cylindrical bearing surface 26 by application of an elevated tension, the residual stresses inside the structure of the strip are reduced. This first method is used in particular for holding strips comprising a matrix of thermoplastic polymer 34.

The second method involves the winding of the holding strip 28 around the cylindrical bearing surface 26 by application of a slight tension. In this way, one limits the decrease in capacity of the strips of the present invention. This second method is used in particular for holding strips comprising fibers arranged in the form of a textile material as described above.

The invention claimed is:

1. A flexible tubular pipe configured for the transport of hydrocarbons, comprising:
   a tubular inner pressure structure comprising a tubular sealing sheath and a pressure vault around the tubular sealing sheath to take up radial stresses;
   a tubular outer tensile structure comprising at least one web of tensile armor wires bearing against the pressure vault, and at least one holding strip wound in a short-pitch helix around the web of tensile armor wires in order to hold the tensile armor wires radially against the pressure vault, and an external sealing sheath that covers the holding layer, the holding strip comprising a layer of polymer material and a plurality of strands of fibers stretched substantially in the longitudinal direction of the holding strip; and
   holes in the holding layer to permit diffusion of gases to reduce corrosion;
   wherein the fibers of the strands of the plurality of the strands of fibers are mineral fibers, and all of the plurality of strands of fibers are entirely embedded inside the layer of polymer material.

2. The flexible tubular pipe as claimed in claim 1, wherein the mineral fibers are basalt fibers.

3. The flexible tubular pipe as claimed in claim 1, wherein the strands of the plurality of the fiber strands are stranded.

4. The flexible tubular pipe as claimed in claim 1, wherein the strands of the plurality of fiber strands are braided.

5. The flexible tubular pipe as claimed in claim 1, wherein the fiber strands of the plurality of fiber strands are distributed uniformly within the layer of polymer material.

6. The flexible tubular pipe as claimed in claim 1, wherein the layer of polymer material has a thickness and a median dividing the layer of polymer material in terms of its thickness into two identical portions, and the fiber strands of the plurality of fiber strands extend within one of the two portions.

7. The flexible tubular pipe as claimed in claim 6, wherein a bottom one of the portions of the polymer material is toward the pressure vault, and the fiber strands are at least in the bottom portion of the polymer material.

8. The flexible tubular pipe as claimed in claim 1, wherein the fiber strands of the plurality of fiber strands are encapsulated in another polymer material.

9. The flexible tubular pipe as claimed in claim 8, wherein the other polymer material is a thermoplastic material.

10. The flexible tubular pipe as claimed in claim 8, wherein the other polymer material is a thermosetting material.

11. The flexible tubular pipe as claimed in claim 1, wherein the polymer material of the layer of polymer material is a thermoplastic.

12. The flexible tubular pipe as claimed in claim 1, wherein the polymer material of the layer of polymer material is thermosetting.

13. The flexible tubular pipe as claimed in claim 1, wherein the layer of polymer material is divided into portions in terms of its thickness, and a bottom one of the portions of the layers of the polymer material is toward the pressure vault, and the fiber strands are at least mostly in the bottom portion of the polymer material.

14. A flexible tubular pipe configured for the transport of hydrocarbons, comprising:
- a tubular inner pressure structure comprising a tubular sealing sheath and a pressure vault around the tubular sealing sheath to take up radial stresses;
- a tubular outer tensile structure comprising at least one web of tensile armor wires bearing against the pressure vault;
- at least one holding strip wound in a short-pitch helix around the web of tensile armor wires in order to hold the tensile armor wires radially against the pressure vault, and an external sealing sheath that covers the holding layer, the holding strip comprising a layer of polymer material and a mat of fiber strands stretched substantially in the longitudinal direction of the holding strip; and
- holes in the holding layer that permit diffusion of gases to reduce corrosion;
- wherein the fibers of the strands of the mat, and the mat of fiber strands are embedded inside the layer of polymer material.

15. The flexible tubular pipe as claimed in claim 14, further comprising the fibers of the strands define a mat that is centered in the thickness direction of the layers of polymer material on a median dividing the layers of polymer material in the thickness direction thereof.

16. The flexible tubular pipe as claimed in claim 14, further comprising the layer of polymer material is divided in a thickness direction thereof between a bottom portion toward the web of tensile armor and a top portion, and the fibers of the strands define a mat in the bottom portion of the layer of polymer material.

* * * * *